Aug. 21, 1956
H. R. OWEN
2,760,052
ILLUMINATED FLOWER STAND
Filed Sept. 18, 1953
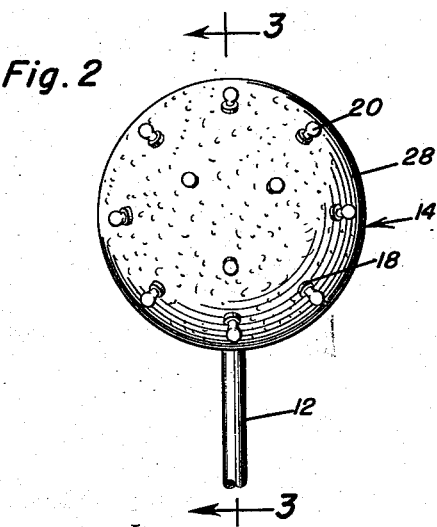
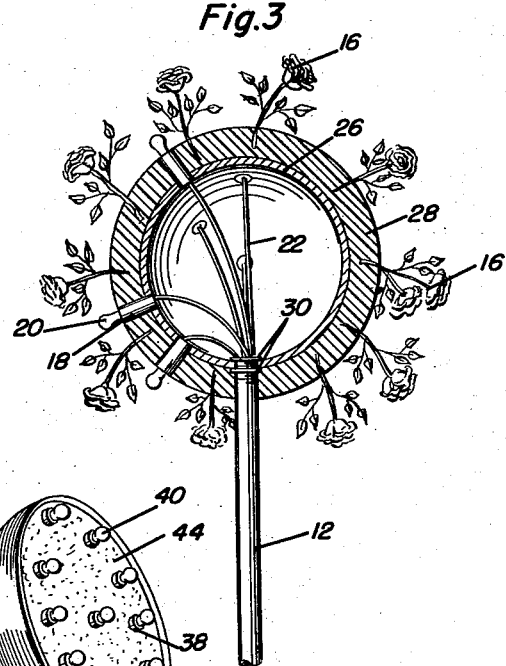
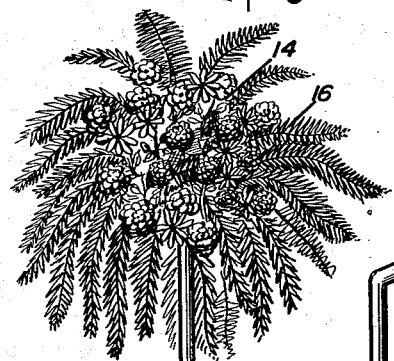
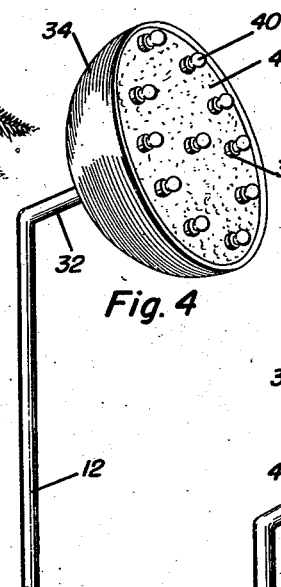
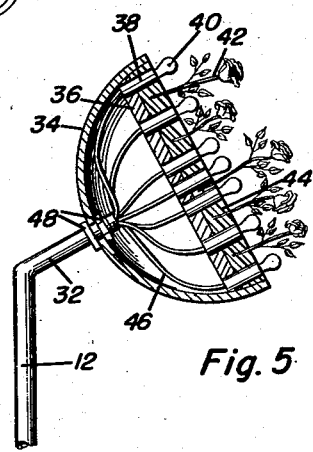
Hazel R. Owen
INVENTOR.

United States Patent Office 2,760,052
Patented Aug. 21, 1956

2,760,052

ILLUMINATED FLOWER STAND

Hazel R. Owen, Columbus, Miss.

Application September 18, 1953, Serial No. 380,989

1 Claim. (Cl. 240—10)

This invention relates to a flower stand and more specifically provides a flower stand having means for supporting flowers thereon and illumination for the flowers.

An object of this invention is to provide a flower stand having a plurality of small light bulbs for illuminating flowers placed on the stand.

Another object of this invention is to provide a flower stand having a standard for supporting flowers in spaced relation to a floor surface and means for holding the flowers in an easily seen position.

A further object of this invention is to provide a flower stand that is simple in construction, easy to assemble and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation showing the flower stand of this invention and the flowers inserted therein;

Figure 2 is a fragmental, side elevation showing the flower holding structure and the illuminating means of the device of Figure 1;

Figure 3 is a transverse, vertical section taken substantially along section line 3—3 of Figure 2 showing structural details of the flower holding means and the flower illuminating means;

Figure 4 is a perspective view of a modified form of flower stand construction; and Figure 5 is a transverse, vertical section taken substantially along the center line of the construction of Figure 4 showing details of the modified form of flower stand.

Referring now specifically to Figure 1, it will be seen that the flower stand of this invention includes a base member 10 substantially similar to a bucket or other container, a tubular standard 12 extending therefrom and a head member 14 having flowers 16 inserted therein. The head 16 is provided with a plurality of light sockets 18 having small light bulbs 20 secured therein and electrical conductors extending through each light socket 18 and down through the tubular standard 12 and out through a base 10 to a conventional house socket (not shown) through the usual plug 24. As best seen in Figure 3, the head member 14 includes a rigid inner part 26 for holding the light sockets 18 and a porous outer portion 28 similar to a foam rubber or foam plastic. The head 14 is secured to the standard 12 by a pair of clamp nuts 30 being positioned on opposite sides of the rigid member 26 which is generally spherical and hollow.

In the modification of Figures 4 and 5 the standard 12 has a angularly extending portion 32 and a head piece 34 generally semi-spherical and a solid closing member 36 across the diameter of the semi-spherical piece 34 for securing light sockets 38 therein having bulbs 40 for illuminating the flowers 42 which are positioned in the foam rubber or plastic 44 in an obvious manner. The sockets 38 are provided with suitable electric conductors 46 passing through the tubular standard 12 and the tubular standard 12 is secured to the semi-sphere 34 by the use of a pair of clamping bolts 48 being positioned on opposite sides of the semi-sphere 34.

The operation of the device will be readily understood. The devices of Figure 2 and Figure 4 operate in the same manner with the device of Figure 2 being displayed wherein the flowers may be seen from all angles and the device of Figure 4 being used where the flower display will be seen only from one side. The light bulbs are secured in the light sockets and suitable flowers and ferns are inserted in the porous member on the outer surfaces of the mounting head and the plug 24 is inserted in a light socket wherein the flowers are illuminated from behind with a soft glowing effect. The device of this invention is especially useful in air-conditioned structures and where wind is encountered thereby making the use of candles for the soft illumination a fire hazard and contradictory to the fire regulations of some areas. The illuminated flower stand of this invention provides the soft glow similar to candles without the possibility of the flowers becoming ignited. The standard and base of this invention may be constructed of any suitable material which is pleasing in appearance and sturdy in construction.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A flower stand comprising a supporting standard and a hollow head having a solid wall mounted on said standard, a plurality of light sockets mounted in said wall and projecting therefrom, a coating of soft porous resilient material on the outer surface of said wall with the sockets extending to the outer surface of the coating for providing access to the sockets, said coating being of a cellular nature for permitting the insertion of green flower stems having little lateral stability whereby the stems will be resiliently gripped throughout the inserted portion and retained in position.

References Cited in the file of this patent

UNITED STATES PATENTS

| 1,050,217 | Ivans | Jan. 14, 1913 |
| 1,515,053 | Johnston | Nov. 11, 1924 |
| 1,938,736 | Berman | Dec. 12, 1933 |
| 1,980,708 | Szel | Nov. 13, 1934 |
| 2,519,690 | Recktenwald | Aug. 22, 1950 |
| 2,618,901 | Braun | Nov. 25, 1952 |

FOREIGN PATENTS

| 766,379 | France | Apr. 16, 1934 |